(12) United States Patent
Wang et al.

(10) Patent No.: US 7,679,832 B1
(45) Date of Patent: Mar. 16, 2010

(54) PROJECTION LENS SYSTEM

(75) Inventors: Kuang-Ju Wang, Taipei Hsien (TW); Chun-Hsiang Huang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/331,400

(22) Filed: Dec. 9, 2008

(30) Foreign Application Priority Data

Oct. 10, 2008 (CN) .......................... 2008 1 0304882

(51) Int. Cl.
 *G02B 9/00* (2006.01)
 *G02B 13/18* (2006.01)
 *G02B 9/60* (2006.01)
 *G02B 9/34* (2006.01)
 *G02B 13/04* (2006.01)

(52) U.S. Cl. ...................... 359/650; 359/714; 359/715; 359/753; 359/770; 359/781

(58) Field of Classification Search ......... 359/649–651, 359/714, 715, 749–753, 770, 781
See application file for complete search history.

(56) References Cited

U.S. PATENT DOCUMENTS

| 5,963,375 | A | * | 10/1999 | Kreitzer ....................... 359/650 |
| 6,069,750 | A | * | 5/2000 | Koizumi et al. ............. 359/783 |
| 6,417,975 | B1 | * | 7/2002 | Isono .......................... 359/783 |
| 6,762,890 | B2 | * | 7/2004 | Sato et al. .................... 359/771 |

\* cited by examiner

*Primary Examiner*—Scott J Sugarman
(74) *Attorney, Agent, or Firm*—Zhigang Ma

(57) ABSTRACT

An exemplary projection lens system includes, in the order from the magnification side to the reduction side thereof, a first lens with a negative refractive power, a second lens with a positive refractive power, a lens group with a negative refractive power, and a third lens with a positive refractive power. The projection lens system satisfies the formula $0.3<|f1/f(2\text{-}4)|<1.0$, where $f1$ is a focal length of the first lens, $f(2\text{-}4)$ is an effective focal length of the second lens, the lens group and the third lens.

17 Claims, 4 Drawing Sheets

PROJECTION LENS SYSTEM

BACKGROUND

1. Technical Field

The disclosure relates to lens systems and, particularly, to a projection lens system.

2. Description of Related Art

In order to reduce sizes of projectors, such as digital light processing (DLP), liquid crystal display (LCD), or liquid crystal on silicon (LCoS) projectors, projection lens systems having short overall length, i.e., the distance between the magnification-side surface of such a projection lens system and a surface of a spatial light modulator (SLM) facing the projection lens system, are highly desirable for mobility. Also, high resolution and a wide field angle of the projection lens system are required. However, correction of aberrations, especially field curvature, distortion, and coma, for acquiring a high resolution becomes a challenge when configuring a projection lens system having a short overall length and a wide field angle.

Therefore, it is desirable to provide a projection lens system which can overcome the described limitations.

DETAILED DESCRIPTION OF THE EMBODIMENTS

Embodiments of the disclosure will now be described in detail with reference to the drawings.

Figure 1:
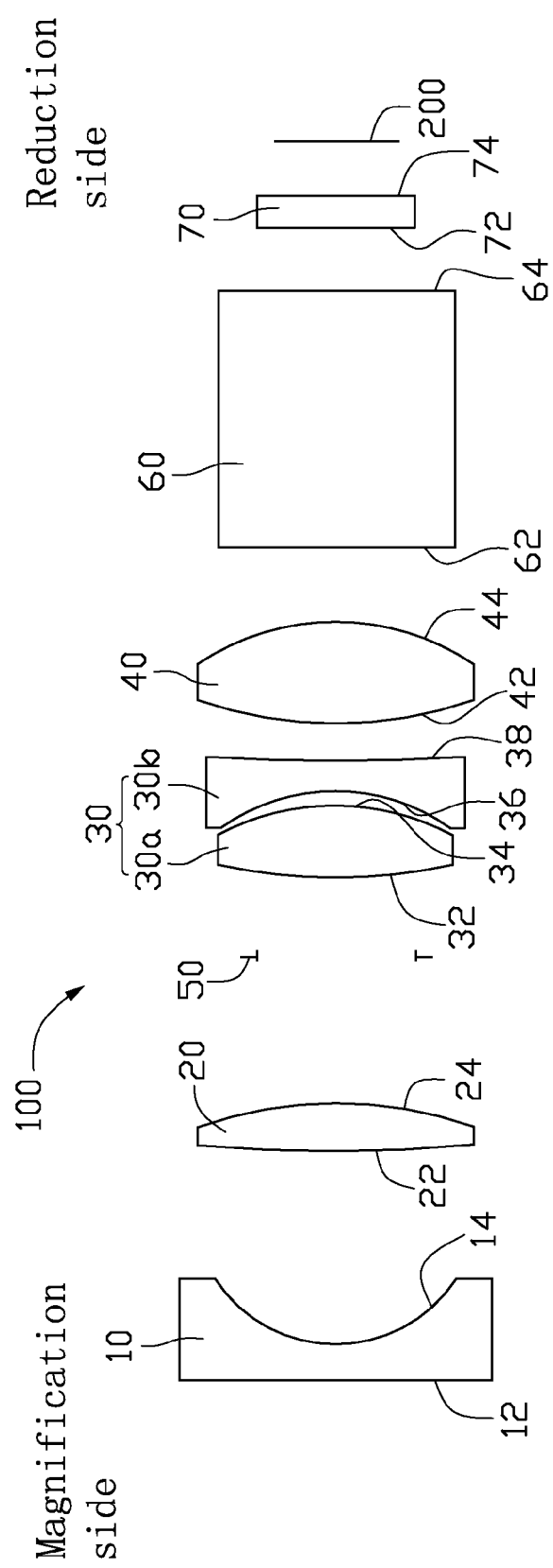
FIG. 1 is a schematic view of a projection lens system in accordance with an embodiment of the disclosure.

Referring to FIG. 1, a projection lens system 100, according to an exemplary embodiment, includes, from the magnification side to the reduction side thereof, a first lens 10, a second lens 20, a lens group 30, and a third lens 40.

The projection lens system 100 may be used in a DLP projector. In addition to the projection lens system 100, the DLP projector further includes a spatial light modulator (SLM) 200, i.e., a digital micro-mirror device (DMD). Signal light from the SLM 200 sequentially transmits through the third lens 40, the lens group 30, the second lens 20, and the first lens 10, and finally projects onto a screen (not shown), producing a magnified image.

The first lens 10 and the lens group 30 have negative refractive powers, while the second lens 20 and the third lens 40 have positive refractive powers. In this embodiment, the lens group 30 includes, from the magnification side to the reduction side of the projection lens system 100, a positive lens 30a with a positive refractive power and a negative lens 30b with a negative refractive power.

To obtain a projection lens system with short overall length, wide field angle, and high resolution, the projection lens system 100 satisfies the formula: (1) $0.3<|f1/f(2\text{-}4)|<1.0$, where f1 is a focal length of the first lens 10, f(2-4) is an effective focal length of the second lens 20, the lens group 30 and the third lens 40. Formula (1) is configured for limiting the focal length of the first lens 10 so as to ensure good divergence property of the first lens 10. Additionally, formula (1) ensures a long back focal length of the projection lens system 100.

In addition, the projection lens system 100 also satisfies the formula: (2) $0.6<R2/f<1.2$, where R2 is a radius of curvature of the reduction-side surface of the first lens 10, f is an effective focal length of the projection lens system 100. Formula (2) is configured to limit the shape of the reduction-side surface of the first lens 10 and control aberrations in the projection lens system 100.

Furthermore, the projection lens system 100 additionally satisfies the formula: (3) $1.6<BFL/f$, where BFL is a back focal length of the projection lens system 100, i.e., a distance between the reduction-side surface of the third lens 40 and the SLM 200. Formula (3) is configured to limit the back focal length of the projection lens system 100 to a proper length, thereby allowing other optical devices of the projector to be accommodated between the third lens 40 and the SLM 200. In the embodiment, a prism 60 and a glass cover 70 are arranged, in the order from the magnification side to the reduction side of the projector, between the third lens 40 and the SLM 200. The prism 60 is configured for altering the direction of the light. The glass cover 70 is configured for protecting the SLM 200.

The projection lens system 100 further includes an aperture stop 50 interposed between the second lens 20 and the lens group 30 to prevent off-axis light rays from the lens group 30 entering the second lens 20, and, as a result, correct coma aberration of the projection lens system 100.

In the embodiment, all the lenses in the projection lens system 100 are made of plastic which minimizes costs. All the lenses are aspheric. The aspheric surfaces are shaped according to the formula:

$$x = \frac{ch^2}{1+\sqrt{1-(k+1)c^2h^2}} + \sum A_i h^i$$

where h is a height from the optical axis of the projection lens system 100 to the aspheric surface, c is a vertex curvature, k is a conic constant, and Ai are i-th order correction coefficients of the aspheric surfaces.

Figure 2:
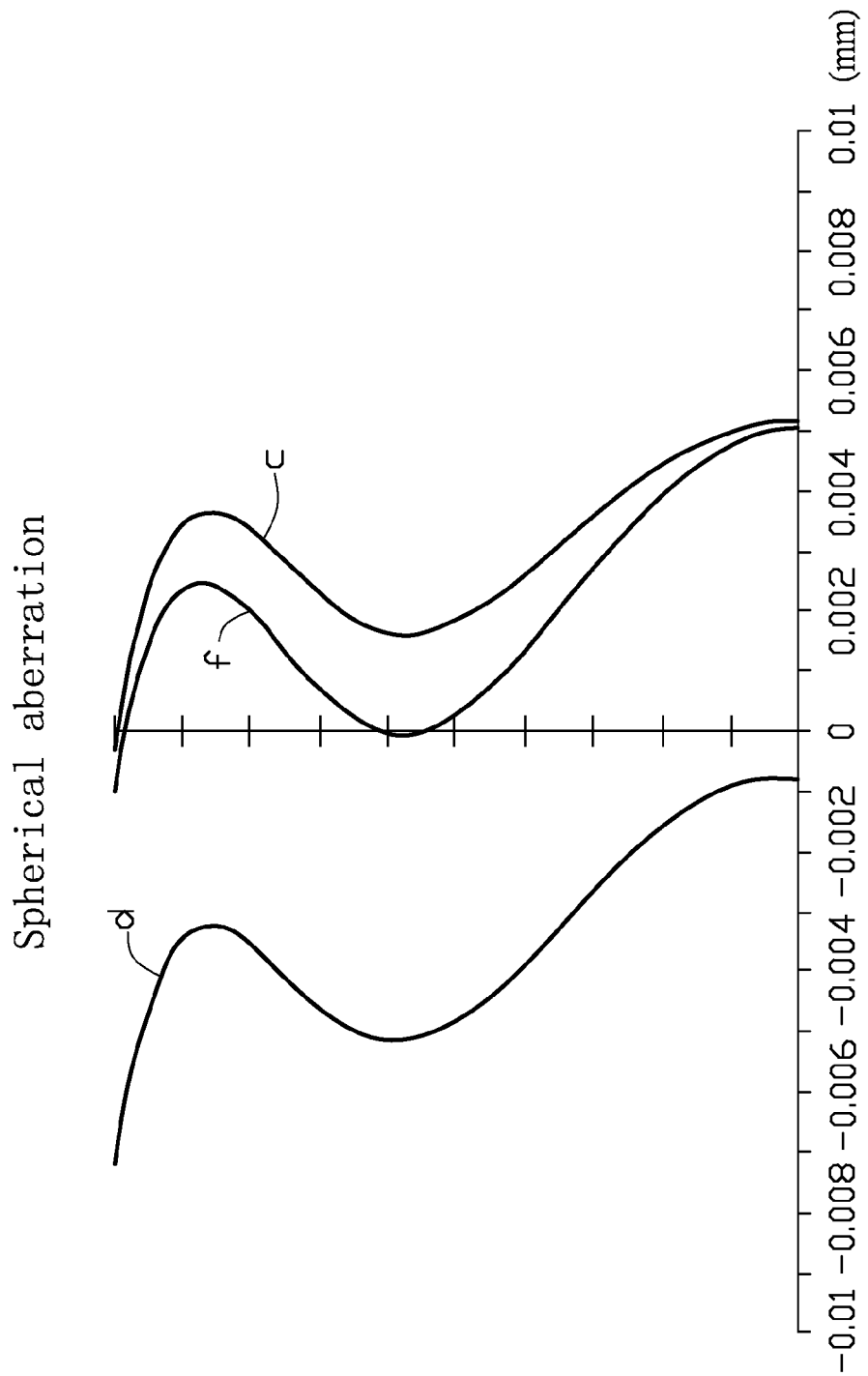
FIGS. 2-4 are graphs respectively showing spherical aberration, field curvature, and distortion of the projection lens system of FIG. 1.
Figure 3:
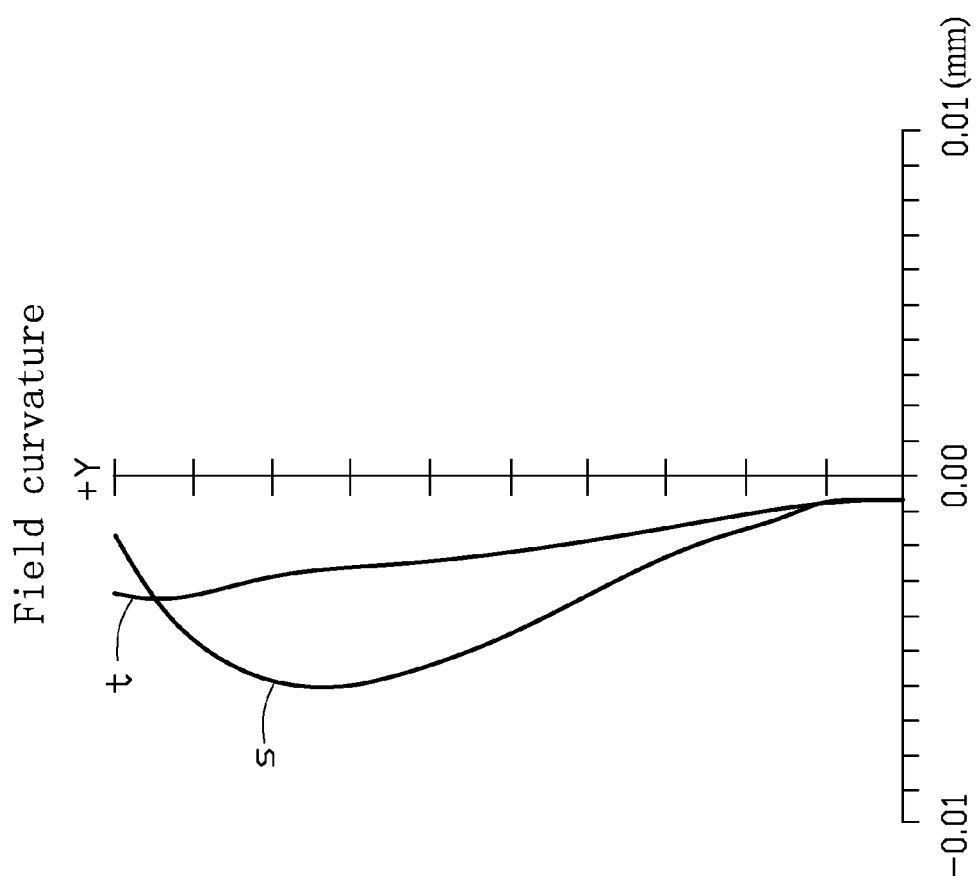
Figure 4:
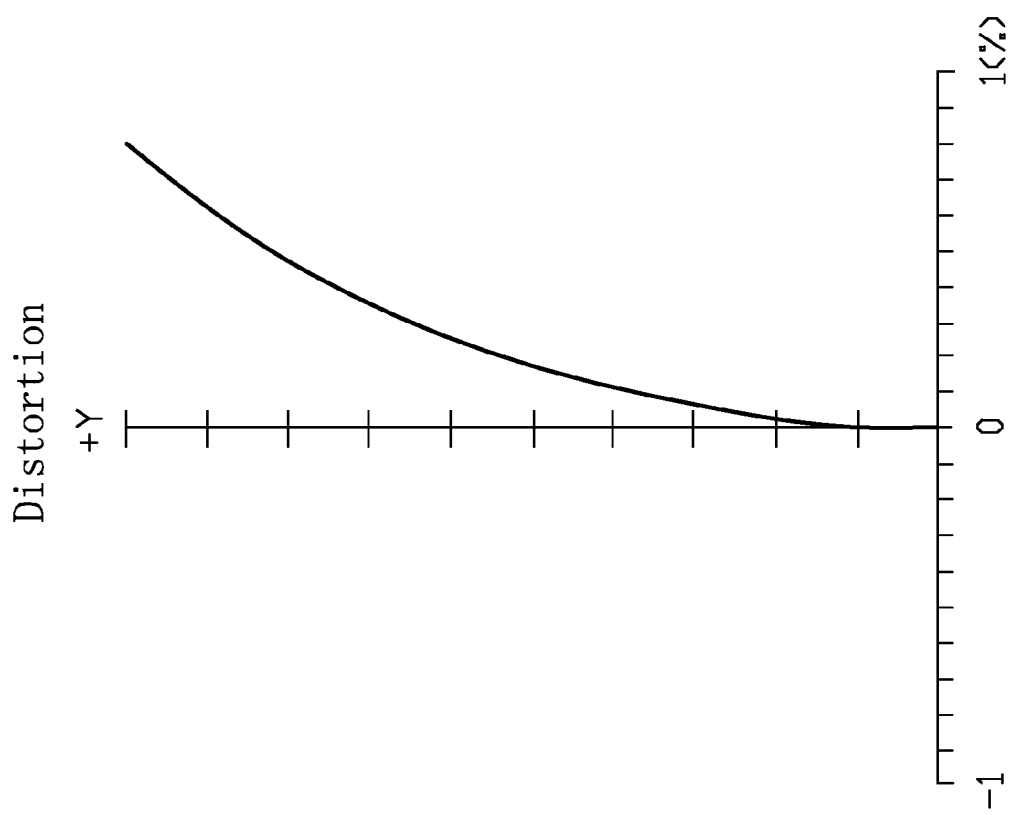

A detailed example of the projection lens system 100 is given here with references to FIGS. 2-4, but it should be noted that the projection lens system 100 is not limited thereto. Following are the symbols used in the example:

$F_{No}$: F number;

$2\omega$: field angle;

R: radius of curvature;

d: distance between surfaces on the optical axis of the projection lens system 100;

Nd: refractive index of lens;

V: Abbe constant; and

TT: total length of the projection lens system 100.

EXAMPLE

Tables 1 and 2 show the lens data of the example, wherein TT=50.95 mm, f=4.33 mm, f1=−7.22 mm, f2=22.74 mm, f4=9.16 mm, f(2-4)=21.44 mm, BFL=14.96 mm, $F_{No}$=2.0; $2\omega$=53°.

TABLE 1

| Surface | R (mm) | d (mm) | Nd | V |
|---|---|---|---|---|
| 12 | −90 | 1.24 | 1.53 | 55.75 |
| 14 | 4.35 | 6.84 | — | — |
| 22 | 55.00 | 1.55 | 1.61 | 26.65 |
| 24 | −18.59 | 13.52 | — | — |
| 50 | infinite | 5.04 | — | — |
| 32 | 21.10 | 2.44 | 1.53 | 55.75 |
| 34 | −8.41 | 0.37 | — | — |
| 36 | −6.23 | 1.1 | 1.61 | 26.65 |
| 38 | 89.99 | 0.32 | — | — |
| 42 | 11.02 | 3.57 | 1.53 | 55.75 |
| 44 | −7.82 | 2 | — | — |
| 62 | infinite | 9 | 1.57 | 56.13 |
| 64 | infinite | 1 | — | — |
| 72 | infinite | 1.05 | 1.52 | 58.57 |
| 74 | infinite | 1.91 | — | — |

TABLE 2

| Surface | k | A4 | A6 | A8 |
|---|---|---|---|---|
| S1 | 0 | 2.7529E−04 | −4.2864E−06 | 2.6117E−08 |
| S2 | −0.7509 | 1.6735E−05 | 1.0624E−05 | −2.0010E−07 |
| S3 | −155.18 | 4.5886E−05 | −1.6573E−06 | 3.5963E−08 |
| S4 | 0.5444 | −5.5833E−05 | −1.8614E−06 | −4.0002E−11 |
| S6 | −8.0789 | 1.6792E−04 | −6.4255E−06 | −5.6195E−08 |
| S7 | −2.1242 | −5.4440E−04 | 2.1355E−05 | −4.2595E−07 |
| S8 | −4.2559 | −1.2978E−03 | 3.6984E−05 | −4.9789E−07 |
| S9 | −125.51 | 2.4693E−04 | −4.3858E−06 | −2.7579E−08 |
| S10 | −13.922 | 3.4499E−04 | −6.8780E−06 | 1.0388E−07 |
| S11 | −1.0226 | 9.2633E−05 | −6.0336E−07 | 8.1746E−08 |

As illustrated in FIG. 2, curves f, d, and c are respectively spherical aberration characteristic curves of f light (wavelength: 460 nm), d light (525 nm), and c light (625 nm) of the projection lens system 100 of the example. The spherical aberration of projection lens system 100 of the example is from −0.01 mm to 0.01 mm. In FIG. 3, the curves t and s represent tangential field curvature and sagittal field curvature respectively. The field curvature of the projection lens system 100 of the example is from −0.01 mm to 0 mm. In FIG. 4, the distortion of the projection lens system 100 of the example is from −1% to 1%.

In the example, though the overall length of the projection lens system 100 is reduced, a wide field angle is obtained, and aberrations of the projection lens system 100 are minimized. Also, the projection lens system 100 keeps chromatic aberration at a small level.

It is to be understood, however, that even though numerous characteristics and advantages of the present embodiment has been set forth in the foregoing description, together with details of the structures and functions of the embodiment, the disclosure is illustrative only, and changes may be made in detail, especially in matters of arrangement of parts within the principles of the invention to the full extent indicated by the broad general meaning of the terms in which the appended claims are expressed.

What is claimed is:

1. A projection lens system comprising, in the order from the magnification side to the reduction side thereof, a first lens with a negative refractive power, a second lens with a positive refractive power, a lens group with a negative refractive power, and a third lens with a positive refractive power, wherein the projection lens system satisfies the formula $0.3<|f1/f(2\text{-}4)|<1.0$, where f1 is a focal length of the first lens, f(2-4) is an effective focal length of the second lens, the lens group and the third lens.

2. The projection lens system of claim 1, wherein the projection lens system further satisfies the formula $0.6<R2/f<1.2$, where R2 is a radius of curvature of the reduction-side surface of the first lens, f is an effective focal length of the projection lens system.

3. The projection lens system of claim 1, wherein the projection lens system further satisfies the formula $1.6<BFL/f$, where BFL is a back focal length of the projection lens system, f is an effective focal length of the projection lens system.

4. The projection lens system of claim 1, further comprising an aperture stop interposed between the second lens and the lens group.

5. The projection lens system of claim 1, wherein the lens group comprises, in the order from the magnification side to the reduction side thereof, a positive lens with a positive refractive power and a negative lens with a negative refractive power.

6. The projection lens system of claim 1, wherein all the lenses are aspheric lenses.

7. The projection lens system of claim 1, wherein all the lenses are made of plastic.

8. The projection lens system of claim 1, further comprising a prism placed at the reduction side of the third lens.

9. A projection system, comprising:
a body;
a projection lens system, mounted in the body, comprising, in the order from the magnification side to the reduction side thereof:
a first lens with a negative refractive power;
a second lens with a positive refractive power;
a lens group with a negative refractive power; and
a third lens with a positive refractive power, wherein the projection lens system satisfies the formula $0.3<|f1/f(2\text{-}4)|<1.0$, where f1 is a focal length of the first lens, f(2-4) is an effective focal length of the second lens, the lens group and the third lens;
a prism placed at the reduction side of the third lens; and
a spatial light modulator placed at the reduction side of the prism.

10. The projection system of claim 9, further comprising a cover, interposed between the prism and the spatial light modulator.

11. The projection system of claim 9, wherein the spatial light modulator is a digital micro-mirror device.

12. The projection system of claim 9, wherein the projection lens system further satisfies the formula $0.6<R2/f<1.2$, where R2 is a radius of curvature of the reduction-side surface of the first lens, f is an effective focal length of the projection lens system.

13. The projection system of claim 9, wherein the projection lens system further satisfies the formula $1.6<BFL/f$, where BFL is a back focal length of the projection lens system, f is an effective focal length of the projection lens system.

14. The projection system of claim 9, wherein the projection lens system further comprising an aperture stop interposed between the second lens and the lens group.

15. The projection system of claim 9, wherein the lens group comprises, in the order from the magnification side to the reduction side thereof, a positive lens with a positive refractive power and a negative lens with a negative refractive power.

16. The projection system of claim 9, wherein all the lenses are aspheric lenses.

17. The projection system of claim 9, wherein all the lenses are made of plastic.

* * * * *